United States Patent [19]
Markiewicz

[11] Patent Number: 5,253,398
[45] Date of Patent: Oct. 19, 1993

[54] DEBURRING SHEAR

[75] Inventor: James S. Markiewicz, Schererville, Ind.

[73] Assignee: Capital Engineering, Inc., Hammond, Ind.

[21] Appl. No.: 847,931

[22] Filed: Mar. 6, 1992

[51] Int. Cl.$^5$ .............................................. B23D 1/22
[52] U.S. Cl. ................................... 29/33 A; 409/293; 409/300; 409/301
[58] Field of Search ............... 29/33 A; 409/293, 298, 409/300, 301

[56] References Cited

U.S. PATENT DOCUMENTS

| | | | |
|---|---|---|---|
| 4,362,448 | 12/1982 | Hasebe et al. | 409/300 |
| 4,498,821 | 2/1985 | Cazaux | 409/300 |
| 4,859,126 | 8/1989 | Mancuso | 409/293 |
| 4,874,274 | 11/1989 | Mancuso | 409/300 |

*Primary Examiner*—Z. R. Bilinsky
*Attorney, Agent, or Firm*—Laff, Whitesel, Conte & Saret

[57] ABSTRACT

A hydraulically-driven deburring shear assembly used to remove dross from the edges of a slab of steel that has been torch cut. The assembly comprises a table assembly, a pair of arms, and a knife assembly. Each arm is adapted to alternately act as a pinch roll and a pusher arm to effect the consecutive deburring of opposed edges of a slab of steel, as follows. After the slab of steel is placed on the table, one of the arms is lowered to rest on the slab and apply a downward pressure on the slab, and the other arm is lowered to come into contact with the leading edge of the slab. At the same time, the knife assembly is raised to the level of the table. The other arm then pushes the leading edge of the slab back over the knife assembly to shear the dross from the edge. Both arms are then raised, the knife assembly is lowered, and the slab is traversed in the forward direction. Thereafter, the knife is raised, the first arm is lowered to the back edge of the slab and the second arm is lowered to rest on the slab. The first arm then pushes the back edge of the slab across the knife assembly to shear the dross off the back edge of the slab.

25 Claims, 11 Drawing Sheets

DEBURRING SHEAR

FIELD OF THE INVENTION

The present invention relates to a device and process to be used in the treatment of steel, and, more specifically, to a device and process for deburring steel.

BACKGROUND OF THE INVENTION

Steel usually is manufactured in long slabs commonly called parent slabs. Due to their lengths, these parent slabs are very difficult to handle and transport, and, in order to make the steel available for use or for further processing in a plate mill, the parent slabs must be cut into shorter, more easily transportable slabs. The most commonly used method of cutting the parent slabs involves the use of a flaming torch. This method, which is called torch cutting, is very effective, except that it leaves residue on the steel where the cut was made in the form of torch dross or slab burr. This residue is an imperfection that must be removed prior to using the steel slabs or running them through a plate mill.

Accordingly, various methods and devices have been developed for removing this residue. A well known device is a hydraulically-operated assembly comprising a table, a knife and a rotatable pinch roll. The table comprises a plurality of axially-spaced rolls. The pinch roll is generally cylindrical and extends along the width of the table. The slab of steel is positioned on the table above the knife assembly, and is held in position by the pinch roller, which rests on top of the slab. The pinch roll and the table rolls are then rotated by a driving mechanism, causing the slab to traverse along the table, until the end of the slab passes over the knife shearing off the dross. The direction of rotation of the pinch roll and table rolls is then reversed so that the dross on the opposite end of the slab can be deburred. The cutting action effected by this device is not always effective, especially where the dross is heavy, because the lateral force applied by the pinch roll and table rolls is not always sufficient.

The knife used with this well known device comprises two single edges that face opposite directions along the table. Each edge is usually oriented at an angle relative to the direction of travel of the slab and being approximately in the same plane as the table. This orientation allows the knife to make what is called a progressive cut.

Accordingly, it is an object of this invention to provide a device and process for deburring steel that improves upon the prior art.

It is a further object of this invention to provide such a device and process that can deburr opposite edges of steel slab more effectively through the use of a pair of arms which are adapted to function not only as pinch rolls but also as pusher arms.

It is a still further object of this invention to provide a shearing knife assembly that improves upon the shearing knife heretofore known.

SUMMARY OF THE INVENTION

In accordance with these and other objects, a device for deburring steel is provided that comprises a pair of arms, a pair of carriage assemblies supported by a frame, a table assembly comprising two tables, and a knife assembly. Each arm preferably is pivotally mounted to one of the carriage assemblies by a bracket and by a pair of hydraulic cylinders, and each arm and its corresponding carriage assembly extend over one of the tables. Each arm comprises a pair of supports which terminate at their distal end in an assembly comprising a pinch roll adapted to be rotatably driven by drive shafts or the like and a pusher wall. The longitudinal axis of the pinch roll and the pusher wall when in use extend perpendicular to the direction of travel of the slab, and are adapted to move in the vertical and horizontal directions.

The carriage assemblies comprise a plurality of wheels received by the frame so that the carriage assemblies and their corresponding arms are adapted to traverse laterally. Accordingly, each arm is adapted to pivot and move laterally and vertically to alternately act as a pinch roller and a pusher arm to consecutively deburr opposite ends of a slab of steel.

Preferably, the table assembly comprises two tables that are separated by the knife assembly, and each table comprises a plurality of rotatable, axially-spaced table rolls, which accommodate the lateral movement of the slab of steel along the tables. The table rolls are rotatably driven in any suitable manner such as by mitre gears or the like.

In the preferred embodiment, the knife assembly comprises a plurality of knives mounted to the top of a housing by a common head. A mechanism is included in the housing that is adapted to raise and lower the common head, so that the knives can be raised to the level of the two tables when the dross is to be sheared off the slab and lowered below the table assembly so that the slab can be traversed unobstructed along the table assembly. Preferably, the knives are generally rectangular, are aligned in a side-by-side relationship, and are oriented at a slight angle relative t the longitudinal axis of the table when both are approximately in the same plane. In addition, each knife is offset relative to its adjacent knives in a progressive manner.

The knife assembly in accordance with the preferred embodiment has two advantages. First, not only does the entire assembly provide a progressive cut, but each individual knife, because of its orientation, can make its own progressive cut. Second, because each knife is aligned adjacent one another, there are no gaps in the cutting surface.

The method of operation is as follows. In the initial position, the arms and the pinch rolls and pusher walls extend above the table assembly, and the knife assembly is in the lowered position below the upper surface of the table. A slab of steel is laid on the first table, and the table rolls are then rotatably driven, causing the slab to be traversed in a forward direction across the table assembly, until the leading edge of the slab rests on the second table. The rolls are stopped. Both pinch rolls and pusher arms first and second arms are lowered, preferably by two pairs of first hydraulic cylinders, so that the first pinch roll comes into contact with and applies a downward pressure on the slab and the second push wall is located adjacent the leading end of the slab. The first and second arms pivot to accommodate the lowering of the pinch rolls and pusher arms. At the same time, the knife assembly is raised so that the knives come into contact with the bottom of the slab.

The second arm, driven by the carriage assembly and a pair of hydraulic cylinders connected to the carriage assembly, then functions as a pusher arm and its second pusher wall pushes the slab in the reverse direction across the knife assembly, while at the same time the pinch roller of the first arm exerts a downward pressure on the slab. In addition, the first pinch roller and the table rolls are activated to simultaneously rotate to accommodate the lateral movement of the slab. As the leading end of the slab is pushed across the knife assembly, the dross on the leading edge of the slab is sheared off in a progressive manner by the knives. The table rolls and first pinch roll drives and the knives lowered are stopped.

Both pinch rolls and pusher walls of the arms are then raised above the slab by the first hydraulic cylinders, causing the first and second arms to pivot, and the table rolls are rotated so that the slab is again traversed in the forward direction until most of the slab is located on the second table. Then the table rolls are stopped. The pinch roll and pusher wall of the first arm are then lowered by the first hydraulic cylinders to a position where the first pusher wall is adjacent the tail end of the slab, and the pinch roll and pusher wall of the second arm are lowered also by the first hydraulic cylinders so that the second pinch roll comes into contact with the slab and applies a downward pressure. The first and second arms pivot to accommodate the lowering of their pinch rolls and pusher arms. The knife assembly is then raised again so that it comes into contact with the bottom of the slab.

The first arm, driven by its carriage assembly and the second hydraulic cylinders connected to the carriage assembly, then functions as the pusher arm and its pusher wall pushes the tail end of the slab forward across the knife assembly. At the same time, the second arm functions as the pinch roller, and its second pinch roller and the table rolls are simultaneously rotating to accommodate the lateral movement of the slab. As the tail end of the slab passes over the knife assembly, the dross on the tail end of the slab is progressively sheared off by the knife assembly.

BRIEF DESCRIPTION OF THE DRAWINGS

The foregoing invention and its advantages may be readily appreciated from the following detailed description of a preferred embodiment, when read in conjunction with the accompanying drawings in which.

DETAILED DESCRIPTION OF THE INVENTION

Figure 1:
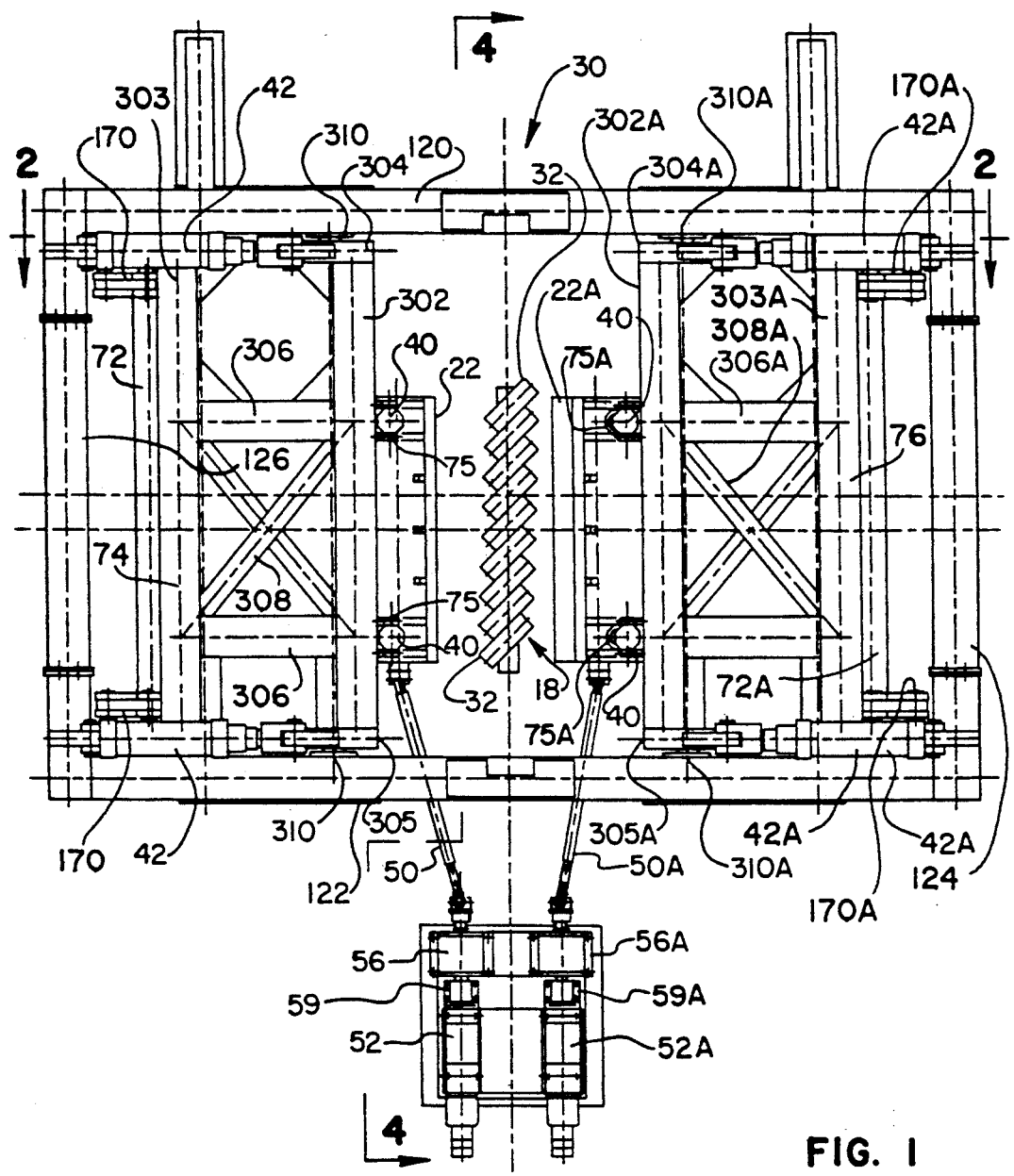
FIG. 1 is a top plan view of a deburring shear in accordance with the preferred embodiment of the invention.

In accordance with the preferred embodiment of the invention shown in FIGS. 1-4, a steel deburring device 10 is provided comprising first and second arms 12, 12A, a table assembly 16, and a knife assembly 18. First and second arms 12, 12A are each adapted to pivot and move laterally and vertically to alternately function as a pinch roller and a pusher arm.

Table assembly 16 preferably comprises first and second tables 24, 26 separated by knife assembly 18, and each table comprises a plurality of axially-spaced, rotatably-driven table rolls 28 adapted to traverse the slab of steel across the tables in either direction during the deburring process. First and second tables 24, 26 are known steel slab tables, and rolls 28 are appropriately mounted in any suitable manner for rotation. The rolls are driven by a drive 28A that is shown schematically in FIG. 2. The drive 28A is for all the rollers 28 even though it is only shown connected to the end rollers.

As shown in FIGS. 1-5, first arm 12 comprises a pair of first arm supports 13, and a cylindrical pinch roll 20 and a pusher wall 22 mounted to the ends of the supports. Both the cylindrical pinch roll 20 and a pusher wall 22 extend along the width of the table assembly. The pinch rolls are rotatably mounted to the first arm supports in any suitable manner, such as by spherical bearings, and are adapted to be rotatably driven in either direction by any suitable means. In the preferred embodiment, for example, the roll 20 is connected to a first drive shaft 50. The drive shaft 50 is rotatably driven by electrical motor 52 and gear reducer 56, which are mounted on a support base 58. Brake 59 should also be included with the motor. Desirably, pusher wall 22 is oriented at a right angle to the table assembly when its arm is functioning in its pushing mode.

Second arm 12A comprises a pair of second arm supports 13A, and a cylindrical pinch roll 20A and a pusher wall 22A mounted to the ends of the supports. Both the cylindrical pinch roll 20A and pusher wall 22A extend along the width of the table assembly. The pinch rolls are rotatably mounted to the second arm supports in any suitable manner, such as by spherical bearings, and are adapted to be rotatably driven in either direction in by any suitable means. In the preferred embodiment, for example, the roll 20A is connected to a second drive shaft 50A. The second drive shaft 50 is rotatably driven by electrical motor 52A and gear reducer 56A, which are mounted on support base 58. Brake 59A should also be included with the motor. Desirably, pusher wall 22A is oriented at a right angle to the table assembly when its arm is functioning in its pushing mode.

Figure 3:
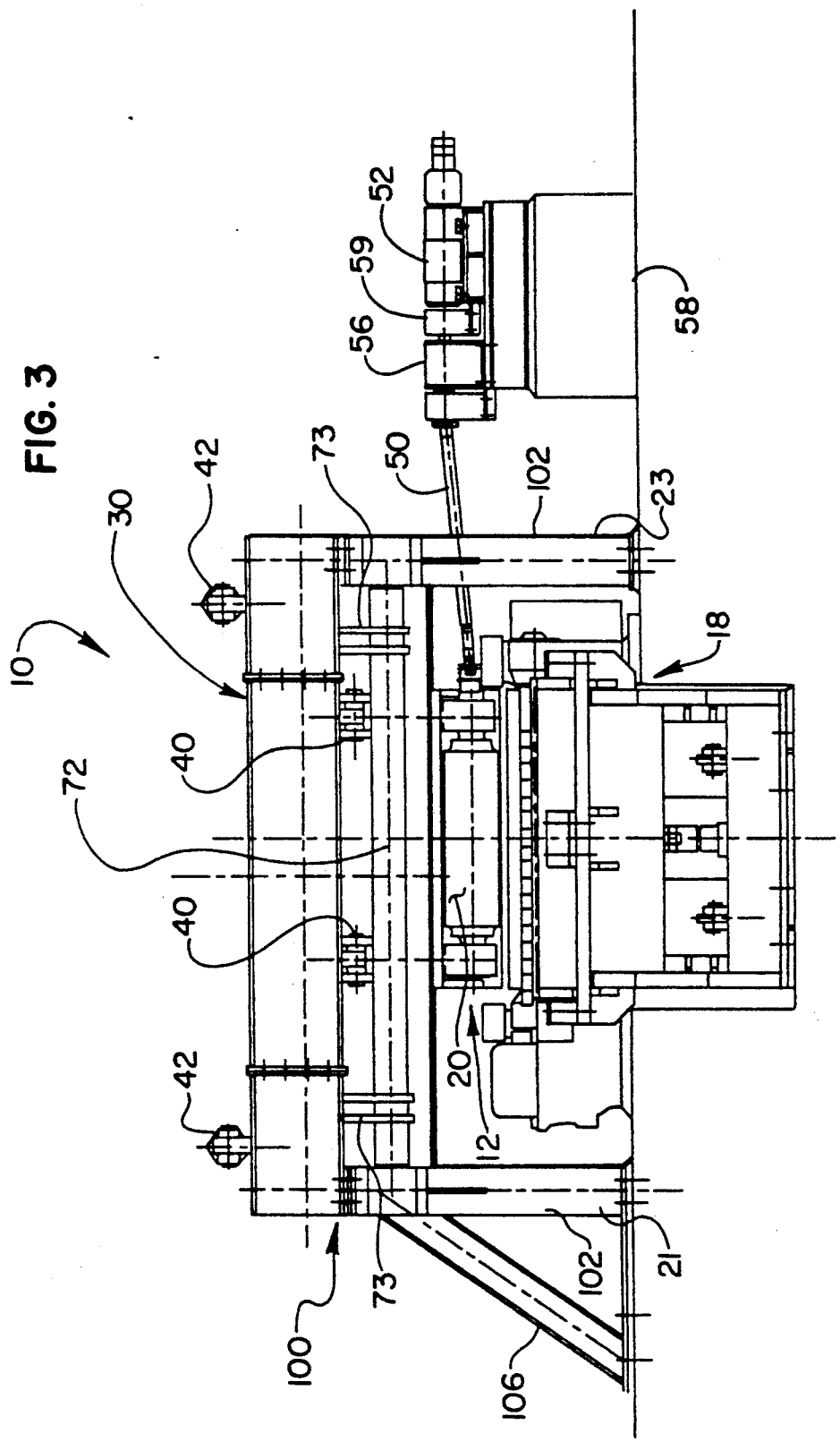
FIG. 3 is a side plan view of the deburring shear of FIG. 1.
Figure 4:
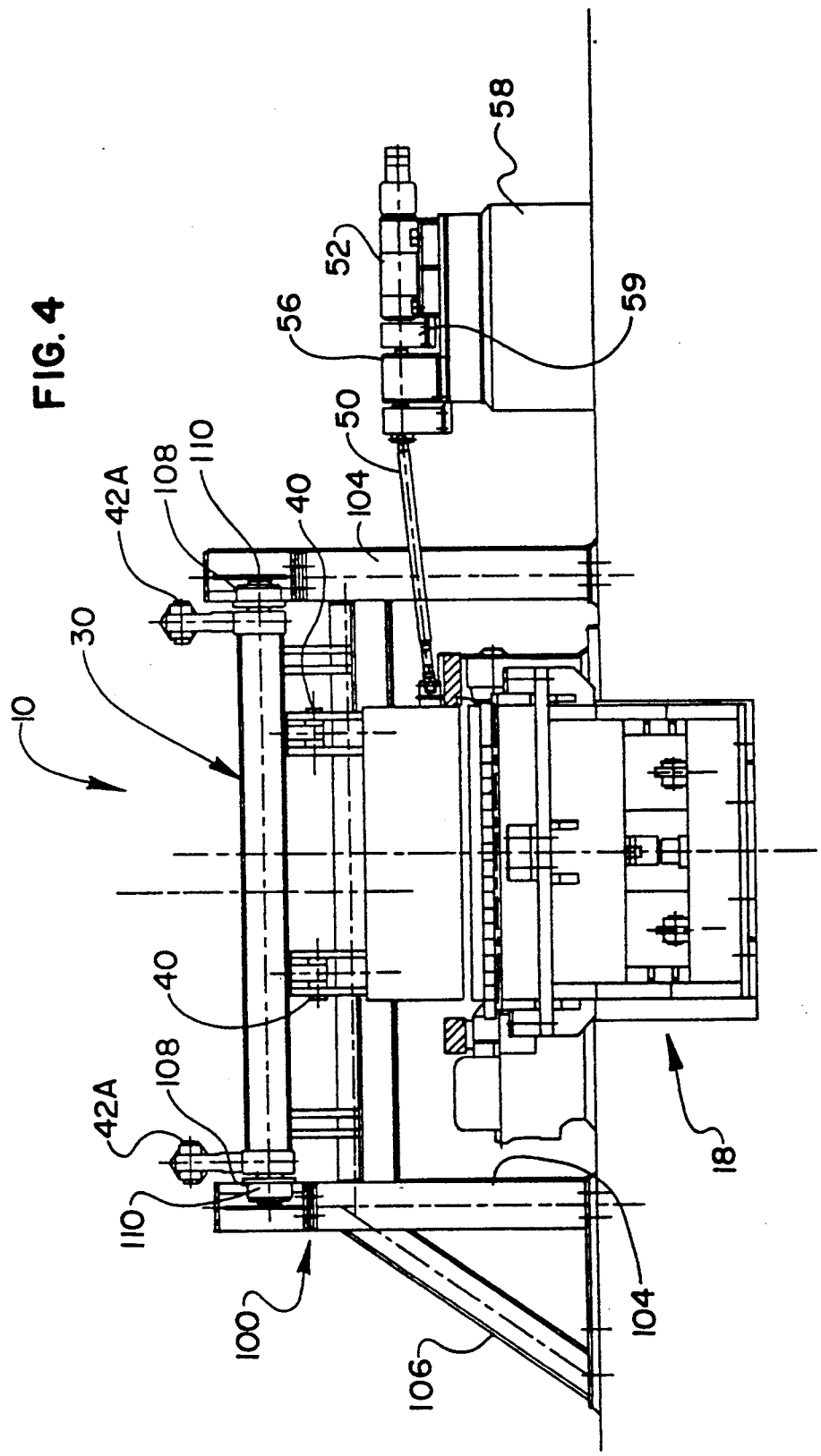
FIG. 4 is a cross section taken along lines 4—4 of FIG. 1.
Figure 5:
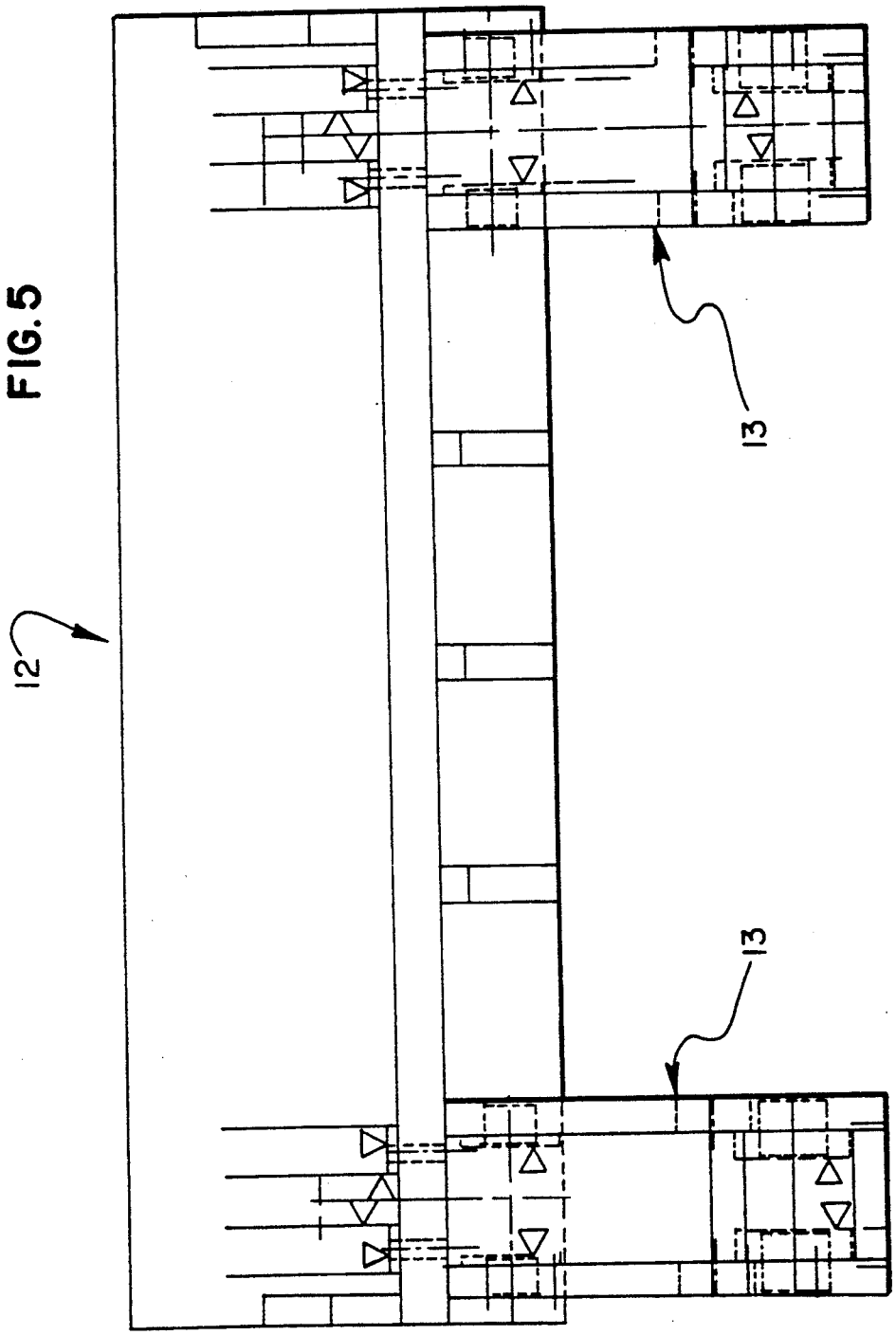
FIG. 5 is a top view of one of the two arms employed in the deburring shear of FIGS. 1-4.
Figure 6:
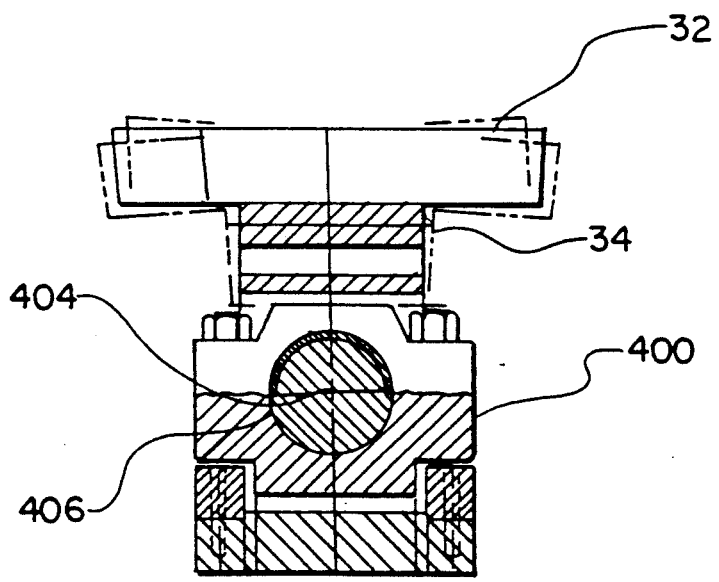
FIG. 6 is a cross section of a preferred embodiment of the knife assembly employed in the deburring shear of FIGS. 1-4.

An elevated frame 30 extends over table assembly 16 and is supported in any suitable manner, such as by a super structure 100 in the form of front end steel wide flange beams 102, a pair of back end steel wide flange beams 104, and a pair of angled steel wide flange beams 106, as shown best in FIGS. 1 and 3. Front end and back end wide flange beams 104, 106 straddle the width of the table assembly, but the table assembly extends lengthwise beyond the super structure. Frame 30 preferably is rectangular and is defined by beams 120, 122, 124 and 126.

Figure 2:
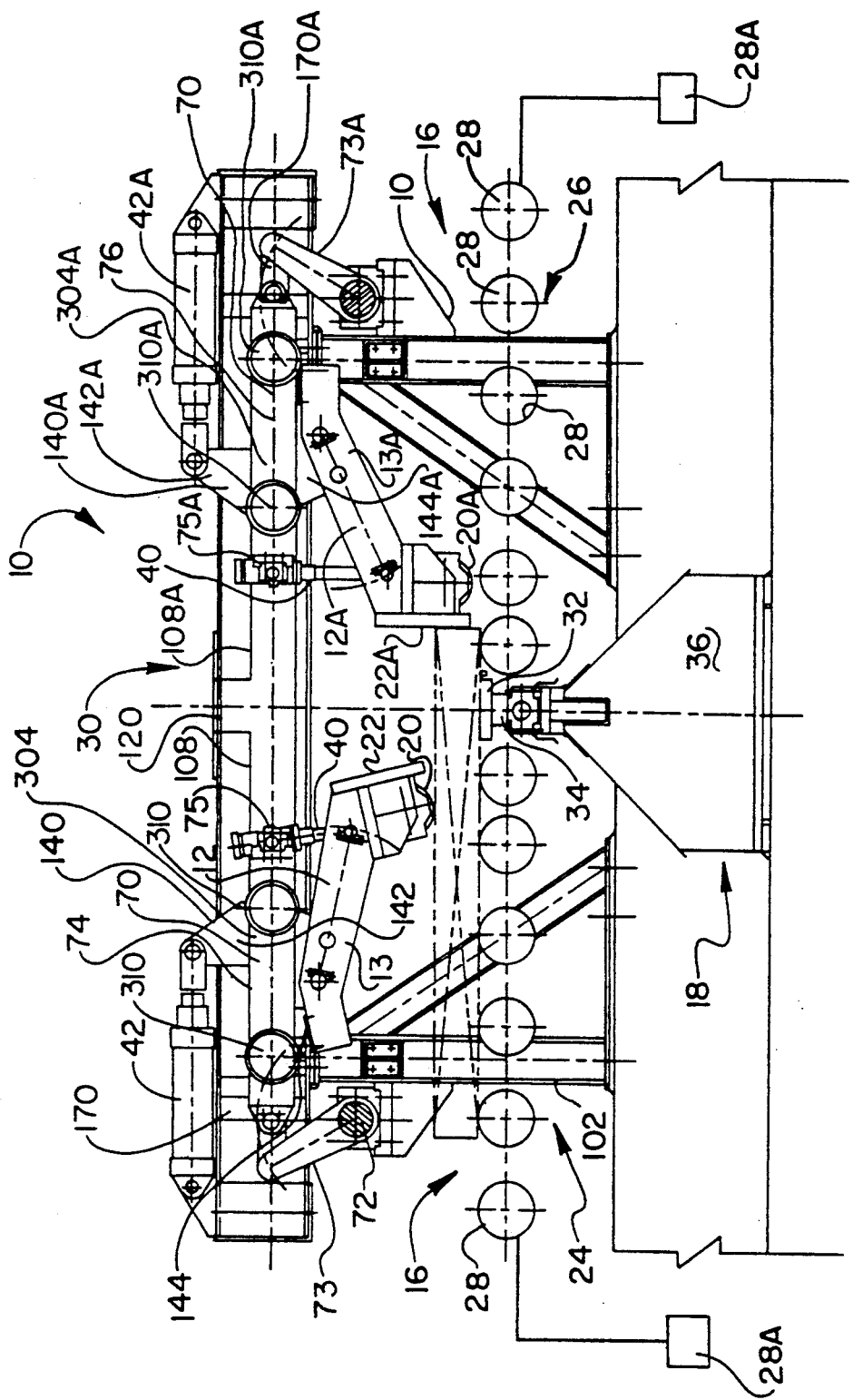
FIG. 2 is a cross section taken along lines 2—2 of FIG. 1.

Disposed within elevated frame 30 are first and second carriage assemblies 74, 76, which are adapted to effect the horizontal movement of the first and second arms 12, 12A and which preferably are driven by two pairs of hydraulic cylinders 42, 42A as shown in FIGS. 1 and 2.

The first arm 12 is pivotally connected to first carriage assembly, and the first arm and first carriage assembly extend over the first table. The first carriage assembly is adapted to traverse laterally a distance along frame 30 sufficient to enable an end of a slab of steel to pass over the knife assembly.

In the preferred embodiment, first carriage assembly comprises a rectangular steel structure comprising two carriage beams 302, 303 and two side beams 304, 305 that are interconnected by a pair of arm beams 306 and cross beams 308. The first carriage assembly 74 is mounted to the frame 30 by a plurality of wheels 310 rotatably mounted on the carriage beams 302 by any suitable means, such as by axles. Preferably, one pair of wheels 310 is mounted to each carriage beam. As shown best in FIGS. 1 and 2, the wheels 110 are adapted to be received within tracks 108 formed on the two opposed beams 120, 122 of frame 30.

Accordingly, wheels 110 and tracks 108 enable first carriage assembly 74 and first arm 12 to traverse laterally along the frame 30 in response to the force of the hydraulic cylinders 42, which connect the first carriage assembly to the frame. Preferably, the wheels 110 are 12 inches in diameter, and the tracks are complimentary in size.

Preferably, a pair of vertical brackets 140 is integral with the first carriage assembly and connects the first arm 12 and hydraulic cylinders 42 to the first carriage assembly. The vertical bracket comprises a top portion 142 that rigidly connects the hydraulic cylinders to the first carriage assembly 74, and a bottom portion 144 that pivotally connects first arm 12 to the first carriage assembly. The pivotal connection of the first arm to the first carriage assembly enables the first arm to pivot during the deburring process.

In addition, an equalizer shaft 72 should be included to ensure that pusher wall 22 is maintained at a right angle to the top of the table assembly 16 when the first arm is functioning in the pusher mode. Preferably, two arms 73 are pivotably mounted to the equalizer shaft, and to carriage beam 303 of the first assembly by links 170. Equalizer shaft 72 interconnects the first carriage assembly to wide flange beams 102.

Pivotally mounted on beam 302 of the first carriage assembly 74 are a pair of hydraulic cylinders 40 that are mounted on a trunnion mount 75 to the distal end of first arm 12. The vertical movement of the first arm 12 is effected by these hydraulic cylinders.

The second arm 12A is pivotally connected to second carriage assembly 76, and the second arm and second carriage assembly extend over the second table. The second carriage assembly is adapted to traverse laterally a distance along frame 30 sufficient to enable an end of a slab of steel to pass over the knife assembly.

In the preferred embodiment, the second carriage assembly comprises a rectangular steel structure comprising two carriage beams 302A, 303A and two side beams 304A, 305A that are interconnected by a pair of arm beams 306A and cross beams 308A. The second carriage assembly 76 is mounted to the frame 30 by a plurality of wheels 310A rotatably mounted on the carriage beams 302A by any suitable means, such as by axles. Preferably, one pair of wheels 310A is mounted to each carriage beam As shown best in FIGS. 1 and 2, the wheels 110A are adapted to be received within tracks 108A formed on the two opposed beams 120A, 122A of frame 30.

Accordingly, wheels 110A and tracks 108A enable second carriage assembly 76 and second arm 12A to traverse laterally along the frame 30 in response to the force of the first hydraulic cylinders 42A, which connect the second carriage assembly to the frame. Preferably, the wheels 110A are 12 inches in diameter, and the tracks are complimentary in size.

Preferably, a pair of vertical brackets 140A is integral with the second carriage assembly and connects the second arm 12A and hydraulic cylinders 42A to the second carriage assembly. The vertical brackets 140A comprise a top portion 142A that rigidly connects the hydraulic cylinders 42A to the second carriage assembly, and a bottom portion that pivotally connects the second arm 12A to the second carriage assembly. The pivotal connection of the second arm to the second carriage assembly enables the second arm to pivot during the deburring process.

In addition, an equalizer shaft 72A should be included to ensure that pusher wall 22A is maintained at a right angle to the top of the table assembly 16 when the second arm is functioning in the pusher mode. Preferably, two arms 73A are pivotably mounted to the equalizer shaft which is mounted to carriage beam 303A of the first assembly by links 170A. Equalizer shaft 72A interconnects the second carriage assembly to wide flange beams 104.

Pivotally mounted on beam 302A are a pair of hydraulic cylinders 40A that are mounted on a trunnion mount 75A to the distal end of second ar 12A. The vertical movement of the second arm 12A is effected by these hydraulic cylinders.

In the preferred embodiment, hydraulic cylinders 40A, 40A are 5 inch diameter bore cylinders with a 12 inch stroke, and hydraulic cylinders 42, 42A are 8 inch bore cylinders with a 30 inch stroke.

Figure 8:
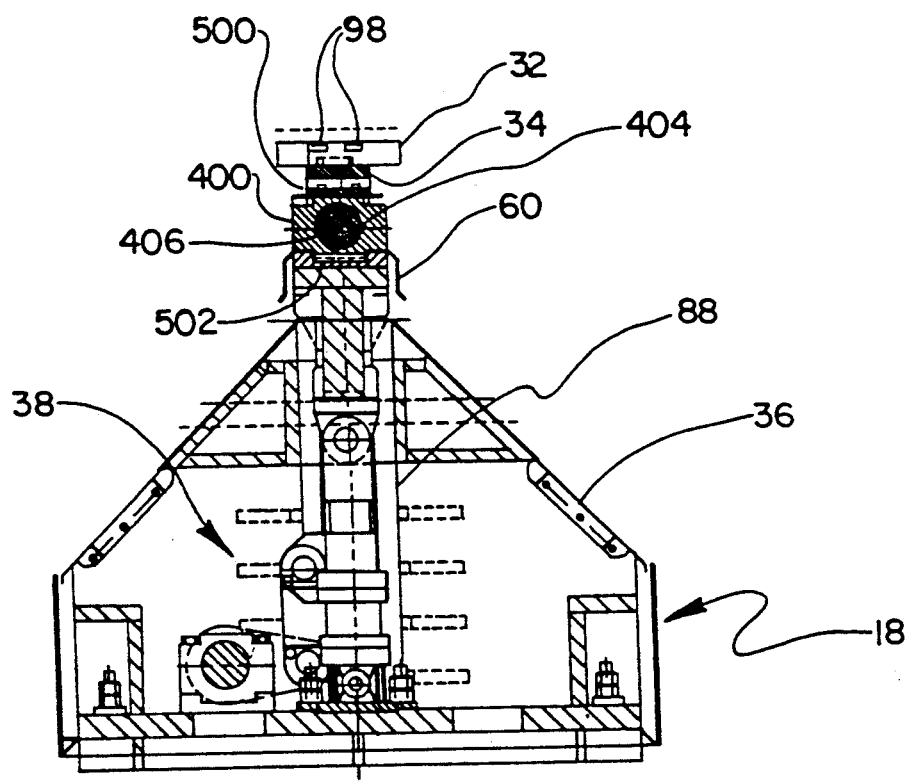
FIG. 8 is a cross section view of one embodiment of the knife assembly of the invention.

In accordance with the preferred embodiment of the invention, knife assembly 18 comprises a plurality of knives 32 mounted to a common head 34 on the top of a vertical slide plate 500, as shown in FIG. 8. The knives are constructed of heat treated tool steel. A mechanism is included in the housing that is adapted to raise and lower the common head, so that the knives can be raised to the level of tables 24, 26 when the dross is to be sheared off the steel slab and lowered below the table assembly so that the slab can be traversed unobstructed along the table assembly. Mechanism 38 may be operated in any suitable manner, but, preferably, it comprises a 5 inch diameter bore hydraulic cylinder 88 adapted to raise and lower common head 34. If desired, the housing may be shrouded by a steel plate 60 in order to keep the dross out of the housing.

Common head 34 is mounted to a trunnion block 400 which is mounted within a machined seat 502 formed on the bottom of the common head. A bore 404 extends through the common head and trunnion block through which a pivot shaft 406 extends. Pivot shaft 406, which is either manually or automatically controlled through an electronic control system, permits the common head to align itself against the bottom of the slab to compensate for any chamber inherent in the slab. Because of this construction, knives 32 are separately pivotable and separately elevatable.

Figure 9:
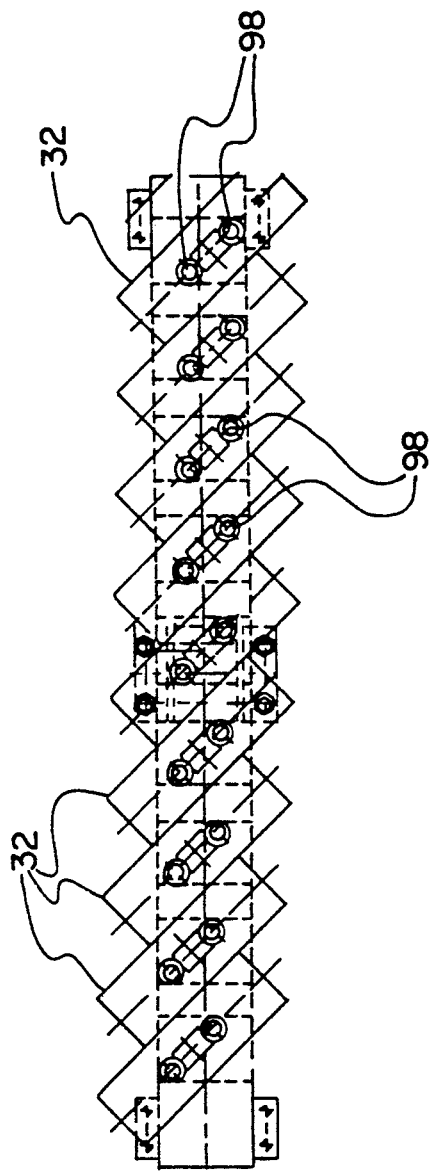
FIG. 9 is a top plan view of the knife assembly of FIG. 5.

As shown best in FIGS. 1 and 9, knives 32 may be generally rectangular and are aligned in a side-by-side relationship. The knives 32 are oriented at a slight horizontal angle relative to the long axis of the table, so that a pair of oppositely-facing corner edges effect the cutting. In addition, each knife 32 is offset relative to its adjacent knives in a progressive fashion, as shown, to enhance the cutting ability of the knife assembly. Knives 32 are mounted to head 34 in any suitable manner such as by bolts 98.

The knife assembly in accordance with the preferred embodiment has two advantages. First, not only does the entire assembly provide a progressive cut, but each individual knife, because of its orientation, can make its own progressive cut. Second, because each knife is aligned adjacent one another, there are no gaps in the cutting surface.

Figure 7A:
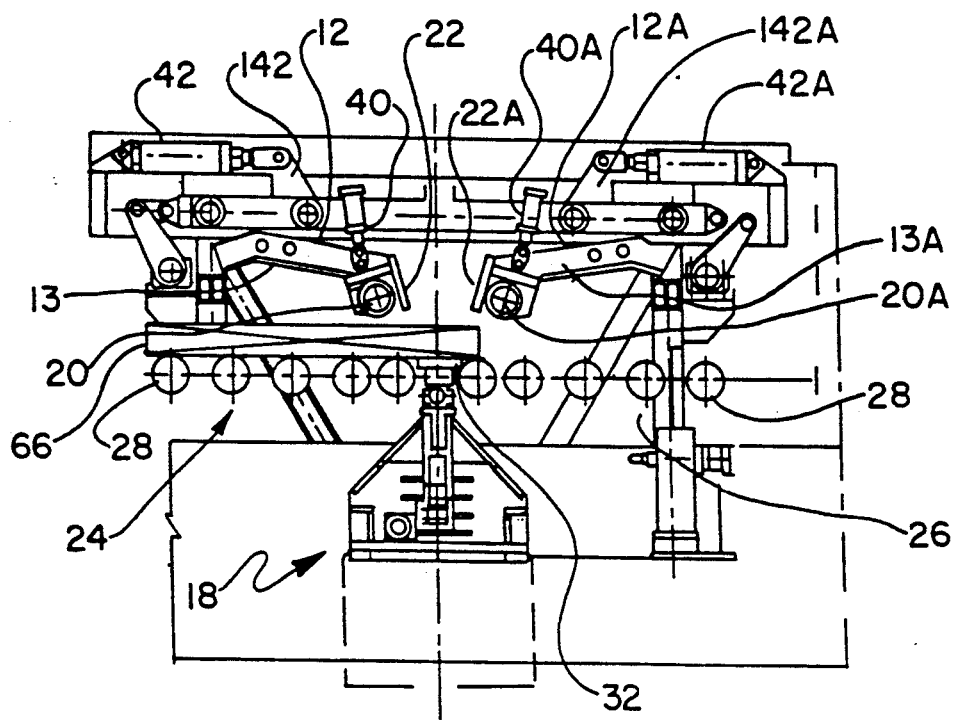
FIGS. 7(a)-7(f) are a sequence of schematics illustrating the various steps of the deburring shear process in accordance with the invention.
Figure 7B:
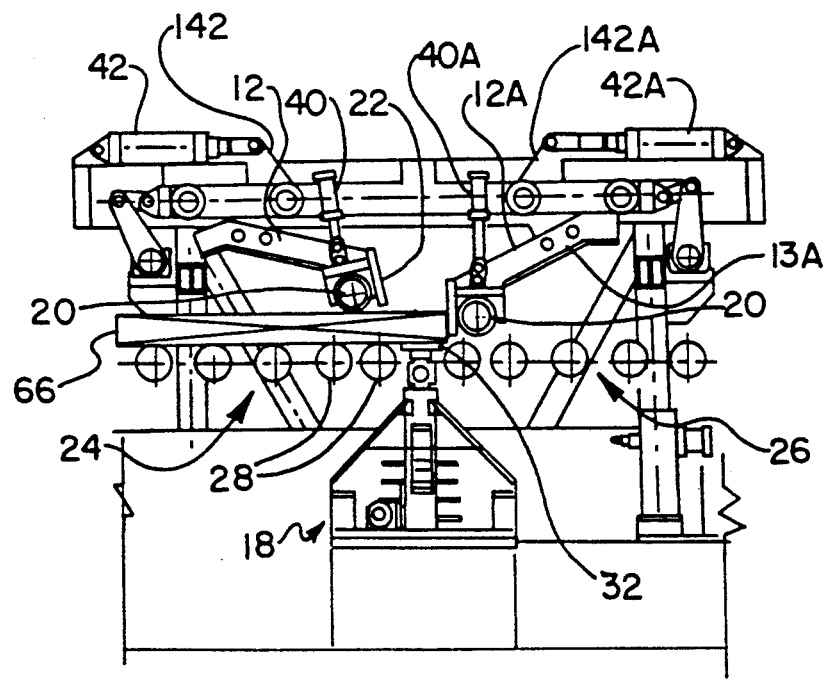
Figure 7C:
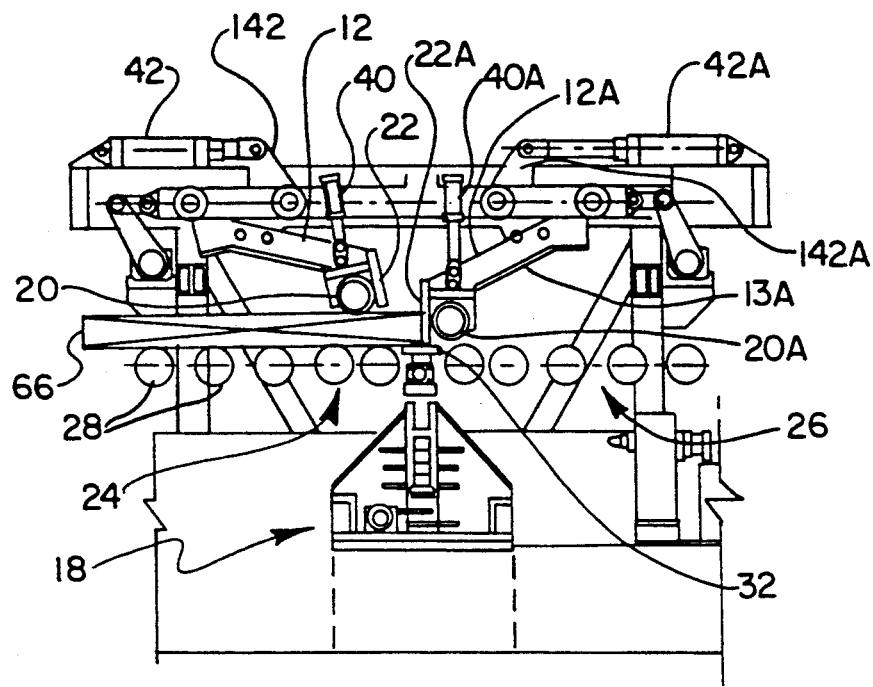
Figure 7D:
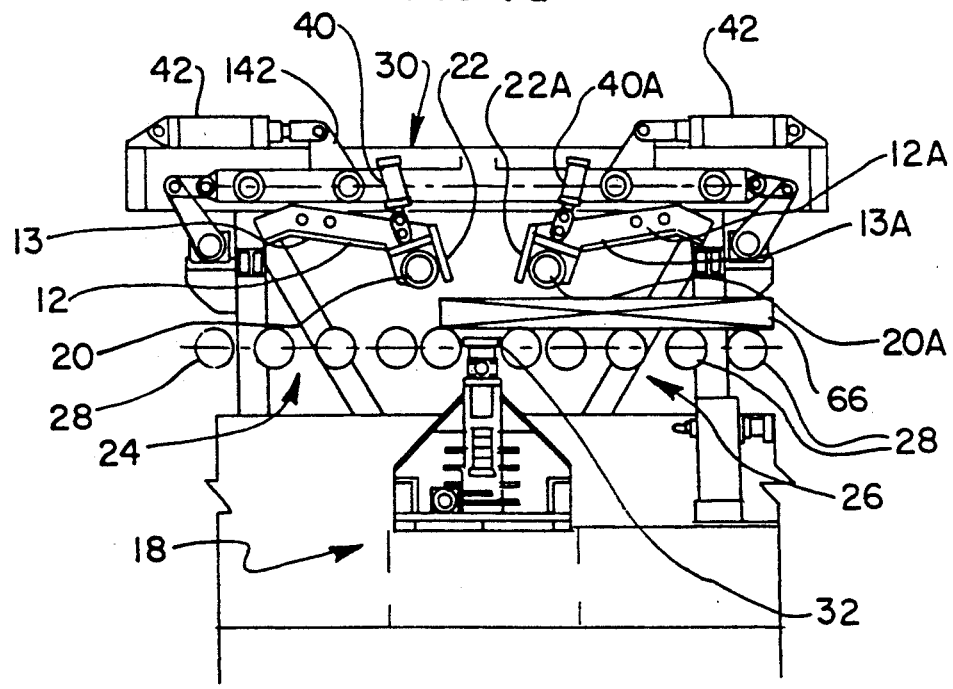
Figure 7E:
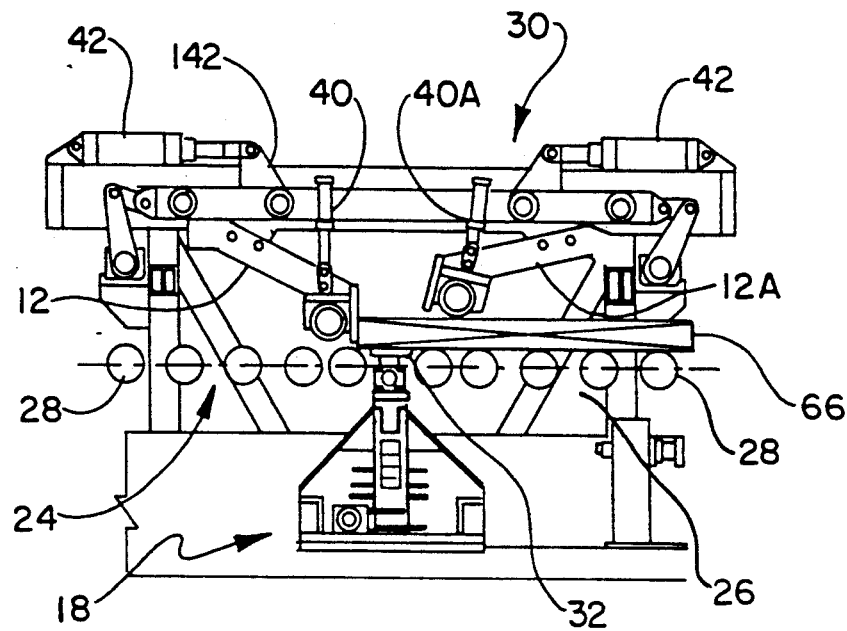
Figure 7F:
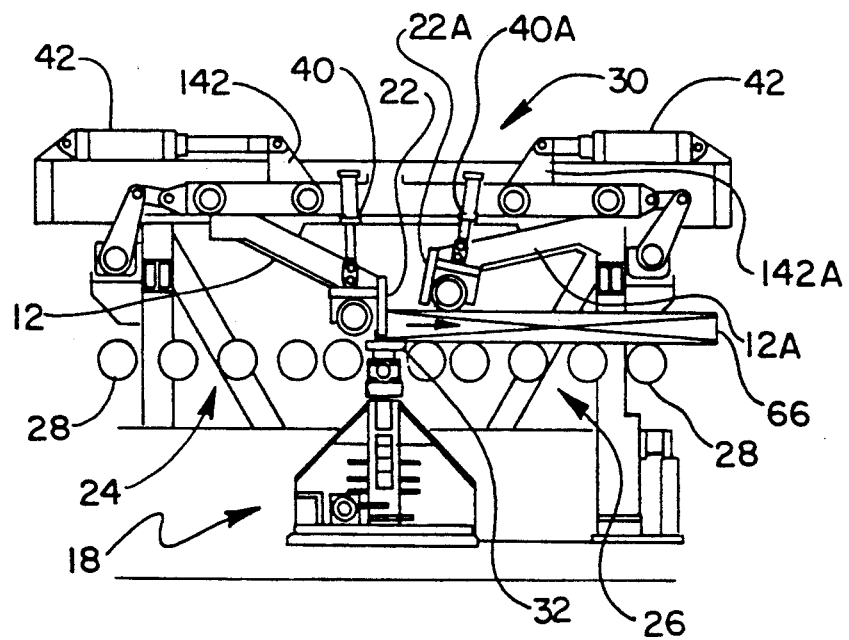

In the preferred embodiment, the deburring shear 10 is hydraulically driven and is operated by an electronic control system. The steps of operation are illustrated schematically in FIGS. 7(a)-7(f). Initially, first and second arms 12, 12A are in the raised position and located above table assembly 16, and knife assembly 18 is in the lowered position so that knives 32 are located below table rolls 28. After a slab of steel 66 is laid on first table 24, the table rolls are rotated causing the slab to traverse across the table assembly until the leading end of the slab rests on the second table. (See FIG. 7(a)). Pinch roll 20 and pusher arm 2 are then lowered by hydraulic cylinders 40 and the first arm pivots so that the pinch roll 20 comes into contact with and applies a downward pressure to the slab, and pinch roll 20A and pusher wall 22A of the second arm 12A are lowered by hydraulic cylinders 40A and the second arm pivots so that the pusher wall 22A is immediately adjacent the leading end of the slab. At the same time, knife assembly 18 is raised so that the knives come into contact with the bottom of the slab. (See FIG. 7(b)). Second arm 12A, driven by second carriage assembly 76 and hydraulic cylinders 42A, then functions as a pusher arm and its corresponding pusher wall 22A pushes the slab back across the knife assembly, while at the same time first arm 12 functions as a pinch roller and applies a downward pressure on the slab. In addition, pinch roll 20 of first arm 12 and table rolls 28 are simultaneously rotating in the reverse direction to accommodate the traversing slab. As the edge of the leading end of the slab is pushed across the knife assembly, the dross on the edge of the slab is sheared off by the knives. (See FIG. 7(c)).

First and second arms 12, 12A are then pivoted and raised above slab 66 by the hydraulic cylinders 40, and table rolls 28 are rotated in the forward direction causing the slab to traverse in a forward direction a further distance down the table assembly 16 until a portion of the tail end of the slab is located on the first table. (See FIG. 7(d)). The pusher wall 22 of first arm 12 is then lowered to a position adjacent the tail end of the slab, and pinch roll 20A of second arm 12A is lowered so that it comes into contact with the slab above the second table. At the same time, knife assembly 18 is raised again so that it comes into contact with the bottom of the slab. (See FIG. 7(e)).

First arm 12, driven by first carriage assembly 74 and hydraulic cylinders 42, then functions as the pusher arm and with its corresponding pusher wall 2 pushes the slab forward across the knife assembly, while at the same time second arm 12A functions as a pinch roller as it applies a downward pressure on the slab and its pinch roller 20A and table rolls 28 are rotating to accommodate the lateral movement of the slab. As the tail end of the slab passes over the knife assembly, the dross on the tail end of the slab is sheared off by the knife assembly. (See FIG. 7(f)). The deburred slab is then ready for use or the next step of the steel treatment process.

The foregoing description is for purposes of illustration only and is not intended to limit the scope of protection accorded this invention. The scope of protection is to be measured by the following claims, which should be interpreted as broadly as the inventive contribution permits.

The claimed invention is:

1. A device for deburring opposite ends of a slab of steel, said device comprising;
   a table assembly having at least one table;
   a knife assembly disposed within the table assembly and having at least one knife; and
   means for consecutively deburring the opposite ends of the slab comprising first and second arms, said first arm adapted to push the first end of said slab in a first direction past said at least one knife to debur the first end of the slab and said second arm adapted to push the second end of the slab in a reverse direction past said at least one knife to debur the second end;
   said first arm having a first pinch roller connected thereto;
   said second arm having a second pinch roller connected thereto, the second pinch roller being in contact with the slab of steel when said first arm is pushing said first end, and the first pinch roller being in contact with said slab of steel when said second arm is pushing said second end.

2. The device of claim 1 wherein said table assembly comprises two tables aligned in a row and separated by said knife assembly.

3. The device of claim 2 wherein said at least one knife is elevatable from a first position to a second position, said second position being adapted to align with the bottom of the slab.

4. The device of claim 1 wherein said knife assembly comprises a plurality of knives mounted to a housing.

5. The device of claim 4 wherein said knives are aligned in a row and each of said knives is oriented at a horizontal angle relative to said two tables.

6. The device of claim 5 wherein each of said knives comprises a pair of oppositely-facing cutting edges forming two rows of cutting edges, one of said rows of cutting edges adapted to debur said first end of said slab, the other of said rows of cutting edges adapted to debur said second end of said slab, and each of said knives is offset relative to the other of said knives in a progressive manner and in a direction of travel of said slab.

7. The device of claim 6 wherein said knives are adapted to move in a direction vertical to said slab to accommodate any chamber in the slab.

8. The device of clam 7 wherein each of said knives is separately pivotable and separately elevatable.

9. The device of claim 8 wherein said device is hydraulically operated.

10. The device of claim 9 wherein said first and second arms each comprises a pair of supports mounted to said respective pinch roller, each said pair of supports having means adapted to function as a pusher wall that extends along the width of said two tables, and each said pusher walls adapted to be oriented at right angles to said two tables when pushing said slab.

11. The device of claim 10 wherein each of said two tables comprises a plurality of axially-spaced cylindrical table rolls that extend along the width of said table, said table rolls being rotatable in both directions and adapted to traverse said slab.

12. The device of claim 11 further comprising two pairs of first hydraulic cylinders and two pairs of second hydraulic cylinders, said first cylinders being adapted to effect vertical movement of said first and second arms, and said pair of second hydraulic cylinders adapted to effect horizontal movement of said first and second arms.

13. The device of claim 12 further comprising first and second carriage assemblies connecting said second hydraulic cylinders to said first and second arms to enable said first and second arms to traverse laterally.

14. The device of claim 13 further comprising a frame assembly extending over said table assembly, said first and second carriage assemblies being disposed within said frame and extending over a corresponding one of said two tables.

15. The device of claim 14 wherein said first hydraulic cylinders are mounted to said first and second carriage assemblies and connect said first and second carriage assemblies to the distal ends of said first and second arms, and said second hydraulic cylinders are mounted to said frame and connect said frame to said first and second arms.

16. The device of claim 15 wherein said second hydraulic cylinders are mounted to said frame via a carriage mounting.

17. A device for deburring opposite ends of a slab of steel, said device comprising:
 two tables comprising a plurality of axially-spaced, rotatable table rolls defining a common plane;
 a plurality of elevatable knives mounted to a housing separating said two tables, said knives being aligned in a side-by-side relationship and being oriented at a slight angle relative to said common plane, each of said knives comprising a pair of oppositely-facing cutting edges forming two rows of cutting edges, one of said rows of cutting edges adapted to debur a first end of said slab, the other of said rows of cutting edges adapted to debur a second end of said slab, each of said knives is offset relative to the other of said knives in a progressive manner and in a direction of travel of said slab;
 first and second pivotable arms, each of said first and second arms comprsiing a pair of supports, a generally cylindrical pinch roller and a pusher wall mounted to each pair of supports, the pusher wall of said first arm adapted to become oriented at a right angle relative to said common plane and to push the first end of said slab in a first direction past said plurality of knives to debur the first end of said slab, and said second arms adapted to become oriented at a right angle relative to said common plane and to push the second end of said slab in a second direction past said plurality of knives to debur said second end of said slab, the pinch roller of said second arm adapted to rest on the top of said slab when the pusher wall of said first arm is pushing said slab and the pinch roller of said first arm adapted to rest on the top of said slab when the pusher wall of said second arm is pushing said slab, both of said pinch rollers and pusher arms adapted to be raised and lowered.

18. The device of claim 17 further comprising a frame supporting the device, first and second carriage assemblies connected to said first and second arms and disposed within said frame, two pairs of first hydrualic cylinders connected to said frame and said first and second arms and adapted to effect vertical movement of said first and second arms, and two pair of second hydraulic cylinders connected to said frame and said carriage assemblies and adapted to traverse the carriage assemblies laterally to effect horizontal movement of said first and second arms.

19. A method of deburring opposite ends of a slab of steel comprising the steps of:
 traversing the slab of steel in a forward direction to a first position on a table assembly;
 lowering toward the table first and second arms each having a pinch roller and means adapted to function as a pusher;
 raising at least one shearing knife to the level of said table assembly;
 positioning said slab with said first arm;
 shearing a first edge of the slab by pushing said slab in the reverse direction with said second arm across said at least one shearing knife;
 raising said first and second arms and lowering said at least one knife;
 traversing said slab of steel to a second position on said table assembly;
 lowering said first and second arms and raising said at least one knife to the level of said table;
 positioning said slab with said second arm; and
 shearing a second edge of said slab by pushing said slab in the first direction with said first arm across said at least one shearing knife.

20. The deburring method of claim 18 wherein said table assembly comprises two tables and wherein said at least one knife is disposed between said two tables.

21. A method of deburring opposite ends of a slab of steel comprising the steps of:
 traversing the slab of steel in a forward direction to a first position on a table assembly comprising two tables;
 lowering toward the table first and second arms, each of said first and second arms comprising a pair of supports and a pinch roller and a pusher wall;
 raising a plurality of shearing knives mounted on a housing between said two tables to the level of said two tables;
 positioning said slab with the pinch roller wall of said first arm;
 shearing a first edge of the slab by pushing said slab in the reverse direction with the pusher wall of said second arm across said plurality of shearing knives;
 raising said first and second arms and lowering said plurality of shearing knives mounted;
 traversing said slab of steel to a second position on said two tables;
 lowering said first and second arms and raising said plurality of shearing knives mounted to the level of said two tables;
 positioning said slab with the pinch roller of said second arm; and
 shearing a second edge of said slab by pushing said slab in the first direction with the pusher wall of said first arm across said plurality of shearing knives.

22. The deburring method of claim 20 wherein each of said pusher walls is oriented at a right angle relative to the level of said table assembly when pushing said slab.

23. The method of claim 22 wherein said knives are aligned in a row and each of said knives is oriented at a horizontal angle relative to said two tables.

24. The device of claim 23 wherein each of said knives is offset relative to the other of said knives in a progressive manner.

25. The device of claim 24 wherein said knives are adapted to move in a direction vertical to said slab to accommodate any chamber in the slab.

* * * * *